United States Patent
Reba et al.

(10) Patent No.: US 11,346,282 B2
(45) Date of Patent: May 31, 2022

(54) GAS TURBINE ENGINE COMPONENT FOR ACOUSTIC ATTENUATION

(71) Applicant: UNITED TECHNOLOGIES CORPORATION, Farmington, CT (US)

(72) Inventors: Ramons A. Reba, South Windsor, CT (US); Bruce L. Morin, Longmeadow, MA (US); Daniel L. Gysling, South Glastonbury, CT (US); Carson A. Roy Thill, South Berwick, ME (US); Jose R. Paulino, Saco, ME (US); JinQuan Xu, East Greenwich, RI (US); Stephen A. Morford, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 678 days.

(21) Appl. No.: 16/251,492

(22) Filed: Jan. 18, 2019

(65) Prior Publication Data

US 2020/0232390 A1    Jul. 23, 2020

(51) Int. Cl.
| | |
|---|---|
| F02C 7/24 | (2006.01) |
| F01D 11/00 | (2006.01) |
| F01D 25/04 | (2006.01) |
| G10K 11/16 | (2006.01) |

(52) U.S. Cl.
CPC .............. *F02C 7/24* (2013.01); *F01D 11/001* (2013.01); *F01D 25/04* (2013.01); *G10K 11/161* (2013.01)

(58) Field of Classification Search
CPC .......... F02C 7/24; F01D 11/001; F01D 25/04; G10K 11/161
See application file for complete search history.

(56) References Cited

U.S. PATENT DOCUMENTS

| | | | |
|---|---|---|---|
| 4,240,252 A | 12/1980 | Sargisson et al. |
| 5,291,672 A | 3/1994 | Brown |
| 7,870,929 B2 | 1/2011 | Farstad |
| 8,215,645 B1 | 7/2012 | Aho, Jr. |
| 9,234,463 B2 | 1/2016 | Benjamin et al. |

(Continued)

FOREIGN PATENT DOCUMENTS

| | | |
|---|---|---|
| EP | 3553283 | 10/2019 |
| FR | 2955152 | 7/2011 |
| GB | 2407346 | 4/2005 |

OTHER PUBLICATIONS

The Extended European Search Report for European Patent Application No. 20152685.2 dated Apr. 8, 2020.

*Primary Examiner* — Aaron R Eastman
(74) *Attorney, Agent, or Firm* — Carlson, Gaskey & Olds, P.C.

(57) ABSTRACT

A section for a gas turbine engine includes a rotating structure, a stationary structure, and a flow guide assembly arranged generally between the rotating structure and the stationary structure. A flow path is defined between the flow guide assembly and one of the rotating structure and the stationary structure. The flow guide assembly includes a plurality of apertures configured to disrupt acoustic waves of air in the flow path. A seal is configured to establish a sealing relationship between the rotating structure and the stationary structure, and wherein an inlet to the flow path is adjacent the seal. A gas turbine engine and a method of disrupting acoustic waves in a flow path of a gas turbine engine are also disclosed.

20 Claims, 6 Drawing Sheets

(56) References Cited

U.S. PATENT DOCUMENTS

| | | | | |
|---|---|---|---|---|
| 10,968,760 | B2* | 4/2021 | Roberge | F01D 5/08 |
| 11,105,215 | B2* | 8/2021 | Roy Thill | F01D 25/246 |
| 2002/0079159 | A1* | 6/2002 | Liu | F04D 29/665 |
| | | | | 181/210 |
| 2013/0259659 | A1* | 10/2013 | Knaul | F01D 11/001 |
| | | | | 415/170.1 |
| 2014/0127007 | A1* | 5/2014 | Aiello | F01D 11/001 |
| | | | | 415/173.7 |
| 2015/0071760 | A1* | 3/2015 | Liu | F04D 29/441 |
| | | | | 415/1 |
| 2015/0233580 | A1* | 8/2015 | Olsen | F23R 3/54 |
| | | | | 60/725 |
| 2015/0337684 | A1* | 11/2015 | Topol | F01D 1/02 |
| | | | | 415/1 |
| 2016/0230778 | A1* | 8/2016 | Mekid | G10K 11/172 |
| 2017/0198708 | A1* | 7/2017 | Wilber | F01D 11/02 |
| 2017/0342851 | A1* | 11/2017 | Narasimharao | F01D 11/02 |

* cited by examiner

GAS TURBINE ENGINE COMPONENT FOR ACOUSTIC ATTENUATION

BACKGROUND

This disclosure relates to acoustic attenuation, and more particularly to acoustic attenuation for adjacent components of a gas turbine engine.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The compressor and turbine sections may include multiple stages of rotatable blades and static vanes. Each section may define one or more passages for communicating airflow to cool portions of the engine. Acoustic waves may be introduced into air in the passages from vibrations caused by operation of the engine.

SUMMARY

A section for a gas turbine engine according to an example of the present disclosure includes a rotating structure, a stationary structure, and a flow guide assembly arranged generally between the rotating structure and the stationary structure. A flow path is defined between the flow guide assembly and one of the rotating structure and the stationary structure. The flow guide assembly includes a plurality of apertures configured to disrupt acoustic waves of air in the flow path. A seal is configured to establish a sealing relationship between the rotating structure and the stationary structure, and wherein an inlet to the flow path is adjacent the seal.

In a further example according to the foregoing example, the rotating structure includes a hub carrying a plurality of blades.

In a further example according to the foregoing example, the hub is a hub of a high pressure compressor in the gas turbine engine.

In a further example according to the foregoing example, at least one of the plurality of apertures is defined by an offset of the flow guide assembly from a baseline geometry of the flow guide assembly.

In a further example according to the foregoing example, a point P is defined along a length of the flow guide assembly. The plurality of apertures are arranged between the point P and an outlet portion of the flow guide assembly.

In a further example according to the foregoing example, the plurality of apertures are arranged in a spiral pattern.

In a further example according to the foregoing example, the point P is a distance from an outlet portion of the flow guide assembly that is approximately equal to an acoustic wavelength associated with an acoustic-structural coincidence frequency in the flow path.

In a further example according to the foregoing example, a percent open area (POA) of the plurality of apertures increases from the point P to the outlet portion of the flow guide assembly.

In a further example according to the foregoing example, the POA of the plurality of apertures increases from about 1% at point P to less than about 10% near the outlet portion of the flow guide assembly.

In a further example according to the foregoing example, the POA of the plurality of apertures increases from about 1% at point P to about 3% near the outlet portion of the flow guide assembly.

In a further example according to the foregoing example, the flow guide assembly includes an inlet portion adjacent an inlet to the flow path, an outlet portion adjacent an outlet to the flow path, and an intermediate portion between the inlet portion and the outlet portion. The plurality of apertures are arranged in one or more circumferential rows in the intermediate portion.

In a further example according to the foregoing example, one or more circumferential rows includes three rows.

In a further example according to the foregoing example, a circumferential row of apertures are adjacent the inlet portion.

In a further example according to the foregoing example, the diameter of the plurality of apertures in the one or more circumferential rows increases from the inlet portion to the outlet portion.

A gas turbine engine according to an example of the present disclosure includes a compressor section that defines a core flow path, the compressor section includes a first compressor and a second compressor downstream of the first compressor. A combustor section is in fluid communication with the compressor section. A turbine section drives the compressor section. At least one of the compressor section and the turbine section includes a rotor assembly. The rotor assembly includes a rotor including a hub carrying a plurality of blades, the hub rotatable about a longitudinal axis. A flow guide assembly is arranged adjacent the hub such that a flow path is defined between the hub and the flow guide assembly. The flow guide assembly includes a plurality of apertures configured to disrupt acoustic waves in the flow path. A seal extends outwardly from the hub to establish a sealing relationship with a plurality of vanes distributed about the longitudinal axis, and an inlet to the flow path is adjacent the seal.

In a further example according to the foregoing example, at least some of the acoustic waves are generated by vibration of the seal.

In a further example according to the foregoing example, point P is defined along a length of the flow guide assembly, and the plurality of apertures are arranged between the point P and an outlet portion of the flow guide assembly.

In a further example according to the foregoing example, the flow guide assembly includes an inlet portion adjacent the inlet to the flow path, an outlet portion adjacent an outlet to the flow path, and an intermediate portion between the inlet portion and the outlet portion. The plurality of apertures are arranged in one or more circumferential rows in the intermediate portion.

In a further example according to the foregoing example, the flow guide assembly is a structure that comprises a single-layered wall.

A method of disrupting acoustic waves in a flow path of a gas turbine engine according to an example of the present disclosure includes communicating flow between a core flow path of the gas turbine engine and an annular flow path. The annular flow path is defined between a rotor hub and a flow guide assembly. The flow guide assembly includes a plurality of apertures configured to disrupt acoustic waves of air in the flow path.

DETAILED DESCRIPTION

Figure 1:
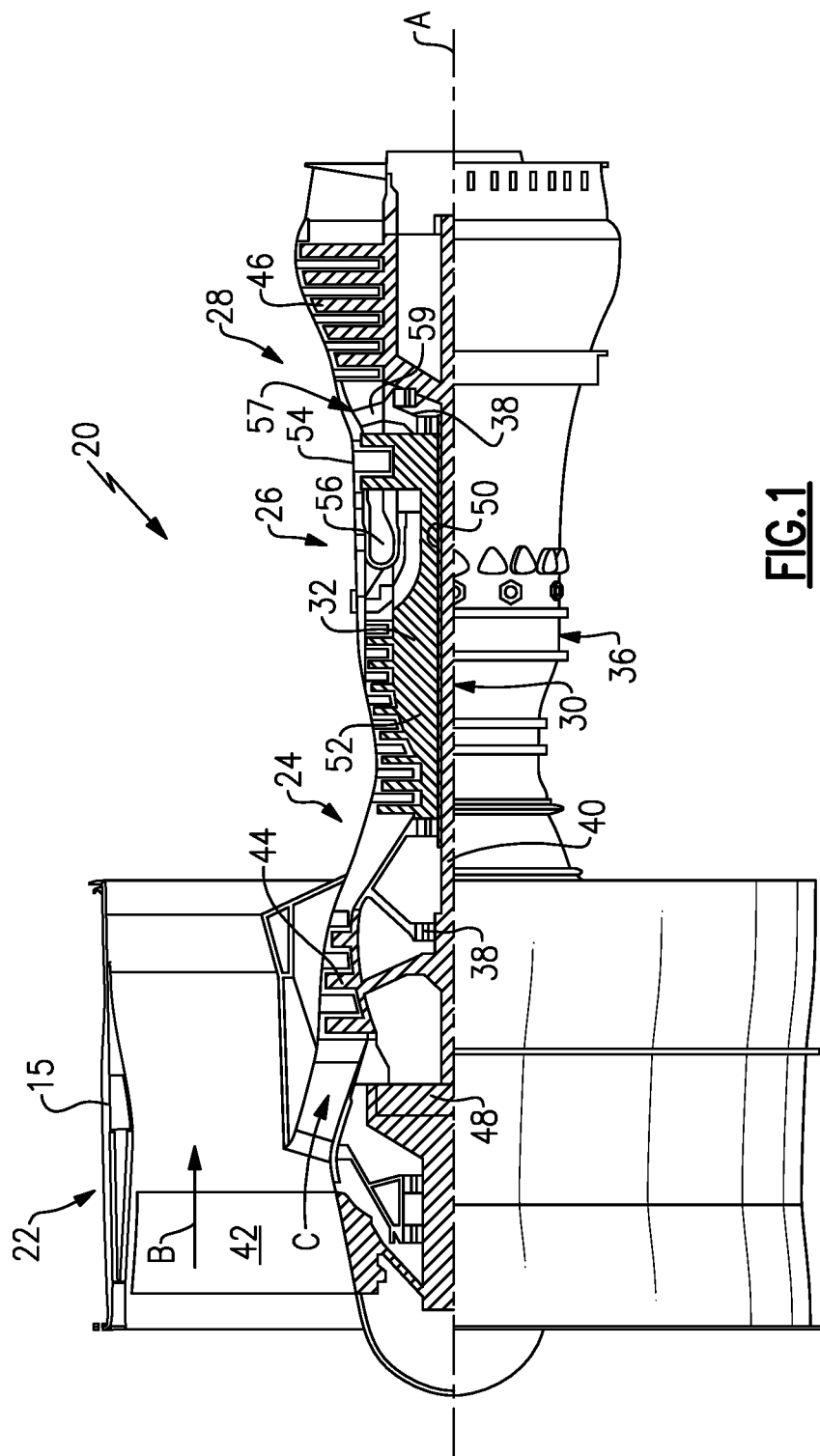
FIG. 1 schematically shows a gas turbine engine.

FIG. 1 schematically illustrates an example gas turbine engine 20. The gas turbine engine 20 is disclosed herein as a two-spool turbofan that generally incorporates a fan section 22, a compressor section 24, a combustor section 26 and a turbine section 28. However, it should be understood the disclosure herein is applicable to other engine architectures as well.

In the example engine 20, the fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 meters/second).

Figure 2:
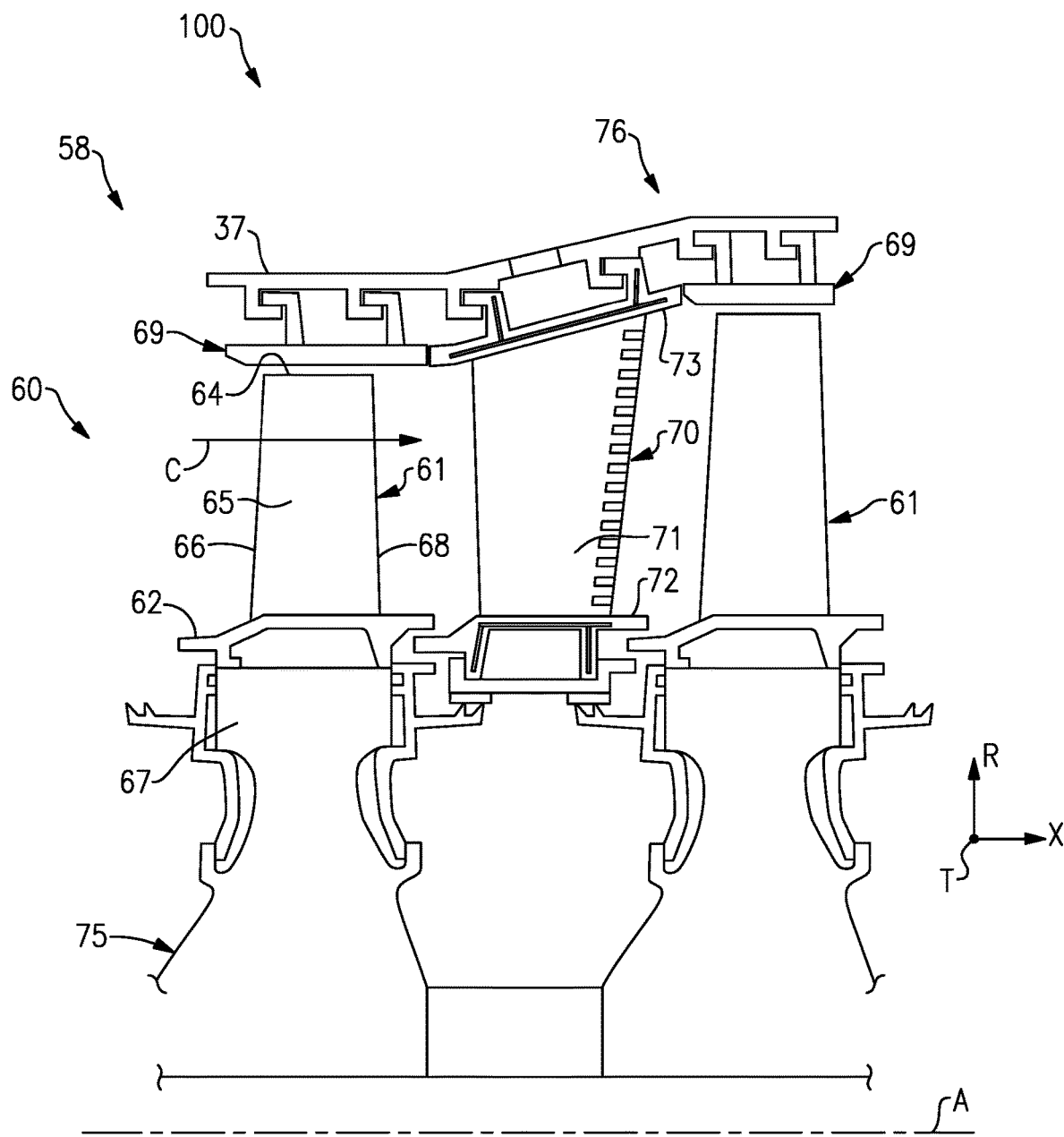
FIG. 2 schematically shows an airfoil arrangement for a section of a gas turbine engine.

FIG. 2 shows selected portions of a section 100 of a gas turbine engine 20. Section 100 can be incorporated into compressor section 24 or turbine section 28 of engine 20, for example. In a particular example, section 100 is incorporated into the high pressure compressor 58. Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 75. A blade outer air seal (BOAS) 69 is spaced radially outward from the tip 64 of the airfoil section 65. The tips 64 of each of the airfoil sections 65 and adjacent BOAS 69 are in close radial proximity to reduce the amount of gas flow that escapes around the tips 64 through a corresponding clearance gap.

A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS (blade outer air seal) 69 arranged circumferentially about the engine axis A. An array of the BOAS 69 are distributed about an array of the airfoils 61 to bound the core flow path C. The BOAS 69 and vanes 70 can be secured to the engine case 37, for example. The engine case 37 provides a portion of the engine static structure 36 (FIG. 1) and extends along the engine axis A.

Figure 3:
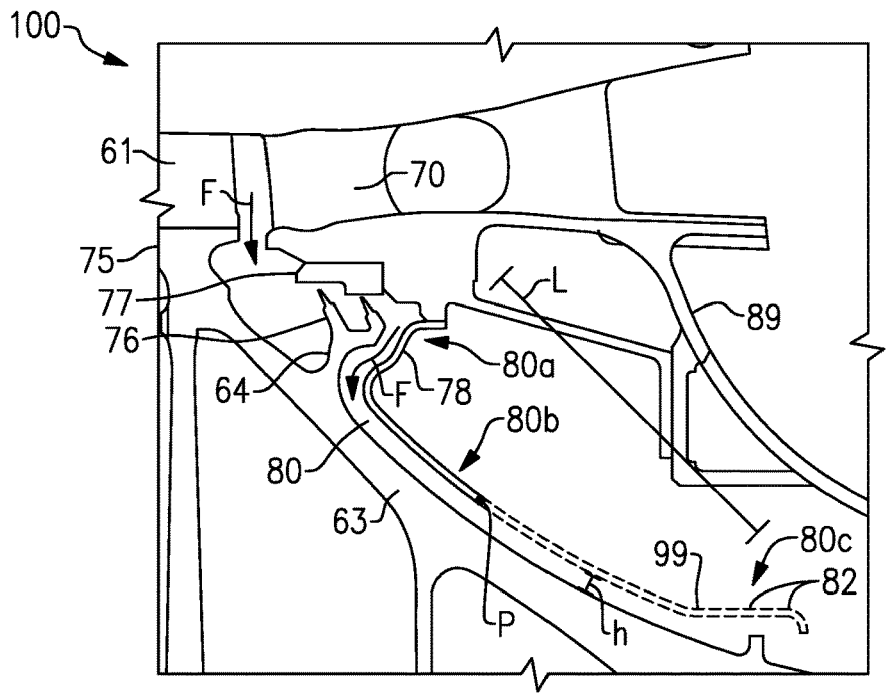
FIG. 3 schematically shows a section of a gas turbine engine including a flow guide assembly according to an example.

Turning now to FIG. 3, FIG. 3 illustrates a detail view of the section 100. The section 100 generally includes a rotating portion and a stationary portion. In this example, the rotating portion is a rotor 75 and the stationary portion is part of the engine static structure 36, such as an inner engine case 89. However, other locations of the engine 20 with adjacent rotating and static structures can benefit from the teachings herein, such as the low pressure compressor 44 or one of the turbines 46, 54 (FIG. 1). Furthermore, systems other than gas turbine engines can also benefit from the teachings disclosed herein, including ground-based power generation systems.

In the example of FIG. 3, the rotor 75 has a hub 63 that carries a plurality of blades or airfoils 61. In this example, the hub 63 is a compressor hub 63. More particularly, the hub 63 is a rear hub of the high pressure compressor 52. The airfoils 61 can be arranged in one or more stages (an aftmost stage shown for illustrative purposes). The hub 63 and airfoils 61 are rotatable about longitudinal axis A. The rotor 75 can be mechanically coupled to a turbine, such as high pressure turbine 54 (FIG. 1).

A rotating seal 76 extends outwardly from the hub 63 to establish a sealing relationship with a row of stationary vanes 70 (one shown for illustrative purposes) distributed about the longitudinal axis A and a seal land 77 on associated supporting structure. In one example, the seal 76 includes one or more knife edge seals. Each seal 76 can include one or more segments arranged about the longitudinal axis A to define a substantially hoop-shaped or annular geometry.

The section 100 includes a flow guide assembly 78 that is dimensioned to guide flow F along a flow path 80. The flow F can be leaked air from the core flow path C, for example. The flow guide assembly 78 is generally between the rotating structure (here, the rotor 75/hub 63) and the stationary structure (here, the inner engine case 89) in the section 100. In this example, the flow guide assembly 78 comprises a single-layered wall. In a further example, the flow guide assembly 78 comprises a metallic material, such as a high temperature metal or alloy.

In the example of FIG. 3, the flow guide assembly geometrically tracks at least a portion the rotating structure, the hub 63, and defines a flow path 80 between the flow guide assembly 78 and the hub 63. In particular, the flow guide assembly 78 has a straight portion 99 that curves away from the hub 63 at the outlet portion 80c of the flow path 80. In particular, at least the intermediate portion 80b of the flow path 80 slopes radially inward from the inlet portion 80a to the outlet portion 80c with respect to the longitudinal axis A, with the inlet portion 80a radially outward of the outlet portion 80c. Walls of the hub 63 that define the flow path 80 slope radially inward from the inlet portion 80a toward the engine longitudinal axis A such that the walls more gradually taper towards the outlet portion 80c.

In other examples, the flow path 80 can be defined between the flow guide assembly 78 and a stationary structure, for instance. Furthermore, in the example of FIG. 3, the flow guide assembly 78 is mounted or otherwise secured to the stationary structure, e.g., the inner case 89 or another portion of the engine static structure 36 such that the flow path 80 is defined between surfaces of the hub 63 and the flow guide assembly 78. It should be understood that in other examples, the flow guide assembly 78 can be mounted or otherwise secured to a rotating structure, e.g., the rotor 75/hub 63. Moreover, the teachings herein can benefit other engine arrangements, such as adjacent components that are both stationary or that are both rotating.

The flow guide assembly 78 can be circumferentially swept about the longitudinal axis A such that the flow path 80 is an annular flow path. The flow guide assembly 78 can be contoured to reduce windage, control temperature and/or pressure of flow F through the flow path 80, and manage loads on various bearings in the section 100. In this embodiment, the flow guide assembly 78 and flow path 80 allows for cooling the hub 63, although other flow guides with other features or functions are contemplated.

The flow path 80 includes an inlet portion 80a, an intermediate portion 80b, and an outlet portion 80c that are established along the flow guide assembly 78. The intermediate portion 80b interconnects the inlet and outlet portions 80a, 80c. In the example of FIG. 3, an end of the inlet portion 80a is adjacent the seal 76.

The flow path 80 has a length L and a height h. In the example of FIG. 3, the length L is an order of magnitude or more than height h for the long, thin flow path 80. In one example, the ratio of h/L for is less than about 0.1. More particularly, the ratio is between about 0.01 and 0.1. Communication of flow F through the flow path 80 may cause an acoustic or unsteady flow field due to the geometry of the flow path 80. The unsteady flow fields may be caused by pressure pulses in the flow path 80 during operation of the engine 20, for example.

The acoustic or unsteady flow field alone or coupled with structural resonance modes may cause vibratory loads in components adjacent to the flow path 80, such as the hub 63. The vibratory loads may be communicated to other portions of the rotor 75. For example, vibratory loads communicated to a neck portion 64 of the hub 63 adjacent the seal 76 may cause the neck portion 64 to pivot or rock back and forth during operation. The motion of this rocking may be amplified at seal locations 76 and may serve to either maintain or amplify the acoustic or unsteady flow field experienced in flow path 80.

Furthermore, in some engine 20 operating conditions, natural structural frequencies of the seal 76 are near the acoustic resonance frequencies of the flow path 80 ("acoustic-structural coincidence"). This reduces aerodynamic damping of the seal 76, which can result in the seal 76 fluttering if other sources of damping are insufficient to stabilize the system. In some examples, small values of h/L can destabilize the system near conditions of acoustic-structural coincidence.

The flow guide assembly 78 includes one or more acoustic attenuation features for reducing vibratory loads in adjacent components of a gas turbine engine. The acoustic attenuation features are apertures or holes 82 in the flow guide assembly 78 which can have various sizes, arrangements, orientations, and geometries, as will become apparent from the below description. In general, the holes 82 include a plurality of holes 82 that have a combined total open area that is selected to improve the aeromechanical stability of the flow guide assembly 78 by attenuating the acoustic or unsteady flow field while maintaining desired flow F pressure in the flow path 80 and structural viability of the flow guide assembly 78. Accordingly, the holes 82 mitigate the destabilizing effects of damping reduction, thereby reducing the likelihood of flutter at the seal 76, and improve the durability of the system without compromising the thermal and mechanical benefits of the flow guide assembly 78 and flow path 80.

In general, the flow path 80 height h is small compared to the acoustic wavelength of the flow path 80, which results in acoustic waves that extend longitudinally along the flow path 80. For example, vibration of seal 76 generates primary acoustic waves adjacent the inlet portion 80a of the flow path 80 which propagate longitudinally through the flow path 80 towards the outlet portion 80c. The acoustic waves are then reflected back through the flow path 80 at the outlet portion 80c of the flow path 80. For certain frequencies, the primary and reflected acoustic waves combine constructively, resulting in acoustic resonance. At or near acoustic resonance, there is a reduction in damping of the system, as discussed above. The holes 82 facilitate dissolution of the acoustic waves due to interaction of the flow F with individual holes 82 (a grazing flow effect) as well as from jetting of leakage flow F out of the flow path 80 and into the surrounding environment. As a result, the primary acoustic waves are attenuated before reaching the reflection point at the outlet portion 80c of the flow path 80, and the resulting reflection wave is weaker or smaller. The reflection/feedback mechanism that generates acoustic resonance is thereby disrupted.

The flow guide assembly 78 has a point P that is a distance along length L (FIG. 3) from the outlet portion 80c of the flow path 80 that is approximately equal to the acoustic wavelength associated with the acoustic-structural coincidence frequency in the flow path 80. In one example, the holes 82 are arranged between the point P and the outlet portion 80c. In this example, the loss of pressure in the flow F is minimized near the inlet portion 80a of the flow path. In other examples, however, holes 82 can additionally or alternatively be located upstream from point P.

The holes 82 can be circular in shape, or can have other geometries. For instance, the holes can be made by laser drilling into the flow guide assembly 78. The holes 82 have a total open area which is the sum of the area of the opening or footprint defined by all of the holes 82 in the flow guide assembly 78. In some examples, the total open area can be expressed as a percentage of the sum of the area of the opening or footprint defined by all of the holes 82 as compared to the total inner surface area of the flow guide assembly 78 (e.g., the surface of the flow guide assembly 78 adjacent to the flow path 80).

Figure 4A:
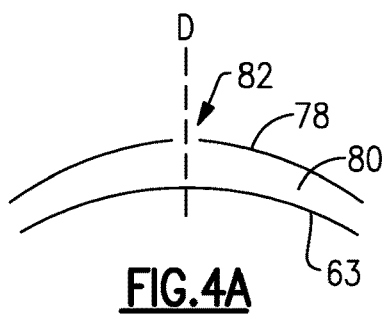
FIG. 4A schematically shows a detail view of a hole in the flow guide assembly of FIG. 3.

FIG. 4A shows a detail view of the holes 82. In the example of FIG. 4A, the holes 82 are oriented normal to a surface of the flow guide assembly 78. That is, the holes 82 are arranged about an axis D that is oriented 90 degrees from the surface of the flow guide assembly 78. In other examples, the axis D of the holes 82 is oriented at greater or less than 90 degrees from the surface of the flow guide assembly 78.

Figure 4B:
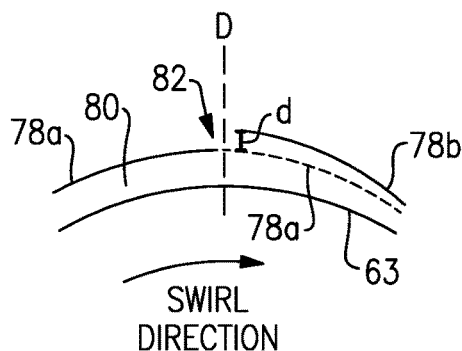
FIG. 4B schematically shows a hole in the flow guide assembly of FIG. 3 with an outward projection.
Figure 4C:
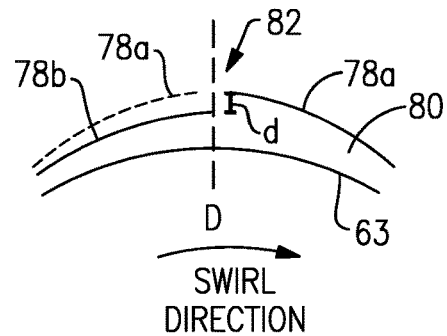
FIG. 4C schematically shows a hole in the flow guide assembly of FIG. 3 with an inward projection.

In some examples, the holes 82 are slots defined by a radially inward or radially outward projection. FIG. 4B shows a radially outward slot projection, in which the flow guide assembly 78 includes a baseline geometry 78a (shown in phantom), and the hole 82 is defined projection d formed by an offset 78b of the flow guide assembly from the baseline geometry 78a. The offset 78b projects outward away from the baseline geometry 78a and away from the flow path 80. FIG. 4C shows a radially inward slot projection, in which the flow guide assembly 78 includes a baseline geometry 78a (shown in phantom), and the hole 82 is defined by projection d formed by an offset 78b which projects inward from the baseline geometry 78a into the flow path 80. In both examples, the offset 78b is spaced from the baseline geometry 78a to form the projection d. Furthermore, in both examples, the offset 78b is oriented such that it faces towards the swirl direction of flow F in the flow path 80. This causes flow to be entrained from the surrounding environment (e.g., outside of the flow path 80), thereby providing acoustic dissipation while eliminating or reducing net leakage from the flow path 80. In some examples, a ratio of a height of the projection d to the height of the flow path h (d/h) is between about 0.5 and 1.0.

The geometry (including size), orientation, and arrangement of the holes 82 on the flow guide assembly 78 is selected to provide a desired total open area. In one example the holes 82 all have uniform geometries, and are arranged close together in areas (e.g., a high density of holes) where higher percent open area ("POA") is desired, and further apart (e.g., a lower density of holes) where lower POA is desired. "POA" as used herein is generally a measure of the area of voids or empty space due to holes 82 in a localized area of the flow guide assembly 78 as compared to an area of a flow guide assembly with the same geometry as the flow guide assembly 78 but without any holes 82.

In another example, the holes 82 are arranged in a uniform density across the flow guide assembly, but are larger where higher POA is desired and smaller where lower POA is desired. In yet another example, the holes 82 have uniform size and hole 82 density, but are simply arranged along the flow guide assembly 78 to provide the desired POA in a given section of the flow guide assembly 78. Other combinations of hole 82 geometry, orientation, size, and arrangement are contemplated by this disclosure. Moreover, this description of holes 82 includes various geometries, sizes, and orientations. It should be understood that the plurality of holes 82 can have uniform geometries, sizes, and orientations, or the plurality of holes 82 can have mixtures of the various geometries, sizes, and orientations discussed above.

Figure 5A:
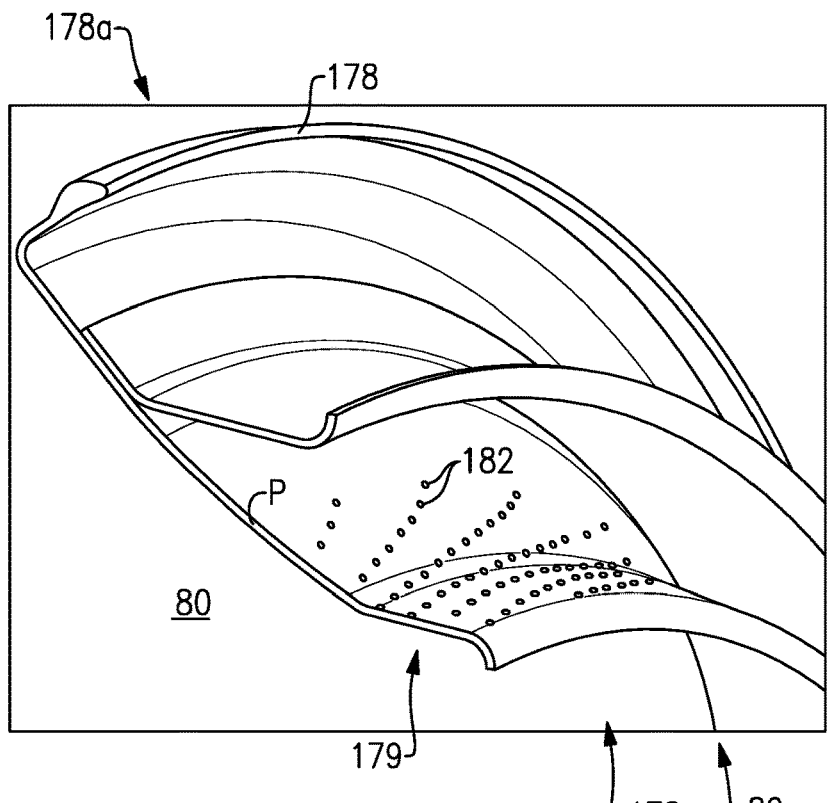
FIG. 5A schematically shows a portion of an example flow guide assembly.
Figure 5B:
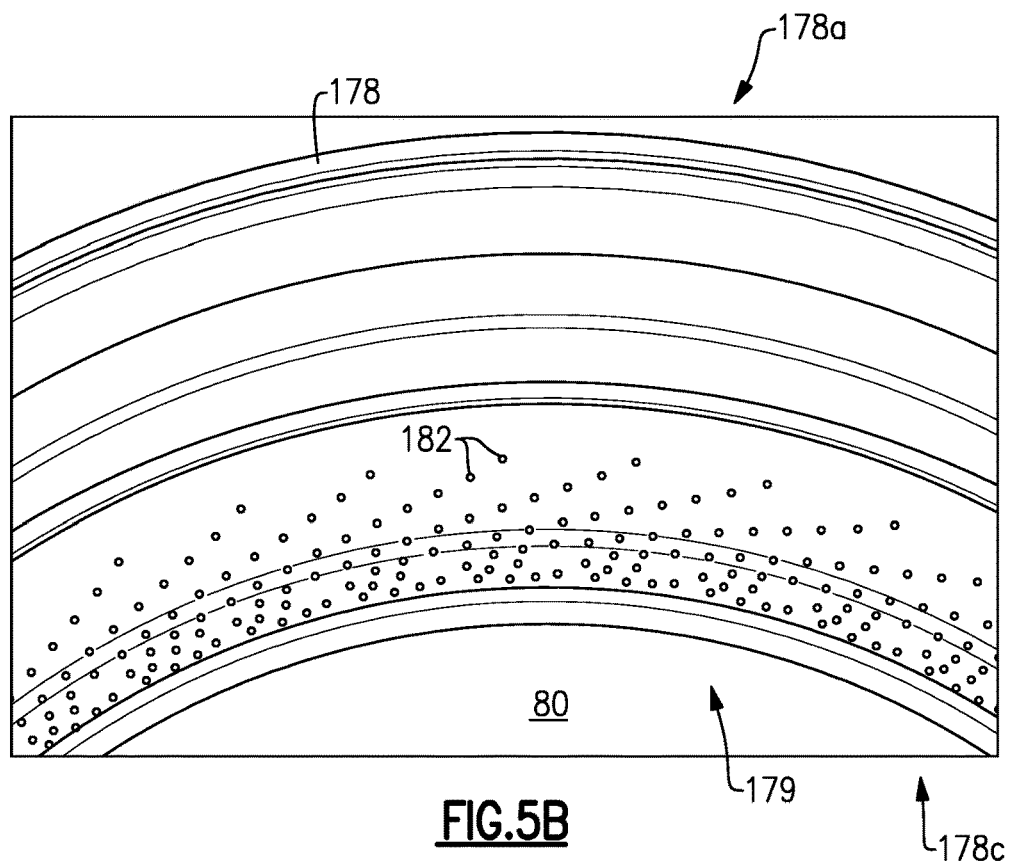
FIG. 5B schematically shows an alternative view of the example flow guide assembly of FIG. 5A.

Turning now to FIGS. 5A-B, an example flow guide assembly 178 with holes 182 is shown. In this disclosure, like reference numerals designate like elements where appropriate and reference numerals with the addition of one-hundred or multiples thereof designate modified elements that are understood to incorporate the same features and benefits of the corresponding original elements. The flow guide assembly 178 has an inlet portion 178a adjacent the inlet portion 80a of the flow path 80 and an outlet portion 178c adjacent the outlet portion 80c of the flow path 80 (see FIG. 2) and downstream from the straight portion 179. In the example of FIGS. 5A-B, holes 182 are generally concentrated at the outlet portion 178c of the flow guide assembly 178. More particularly, moving from the inlet portion 178a to the outlet portion 178c, the arrangement of holes begins at point P (FIGS. 3 and 5A) on the flow guide assembly 178, and the POA of holes 182 gradually increases moving from P along straight portion 179 and to the outlet portion 178c. The gradual increase in POA of holes 182 prevents a significant impedance discontinuity in the flow guide assembly 178 wall that bounds the flow F in the flow path 80. A solid wall (e.g., one with no holes) has a high impedance whereas a wall with a high POA of holes has a low impedance. An abrupt change in the impedance of the flow guide assembly 178 (e.g., the sudden introduction of many holes with high POA) might cause acoustic waves to reflect, similar to the reflection of waves due to the impedance discontinuity at the outlet 80c of the flow path 80 discussed above. Accordingly, the holes 182 have a size, geometry, orientation, and arrangement selected so that the POA of the holes 182 gradually increases from the point P to the outlet portion 178c. In the example of FIGS. 5A-B, the holes 182 are circular and are arranged in a spiral pattern. In a particular example, the holes have a diameter of about 0.04 inches (about 1 millimeter).

In one example, the size and density of the holes 182 is selected so that the POA of the holes 182 increases from about 1% at point P to less than 10% at the outlet portion 178c. In a more particular example, the size and density of the holes is selected so that the POA of the holes 182 increases from about 1% at point P to about 3% at the outlet portion 178c.

Figure 6A:
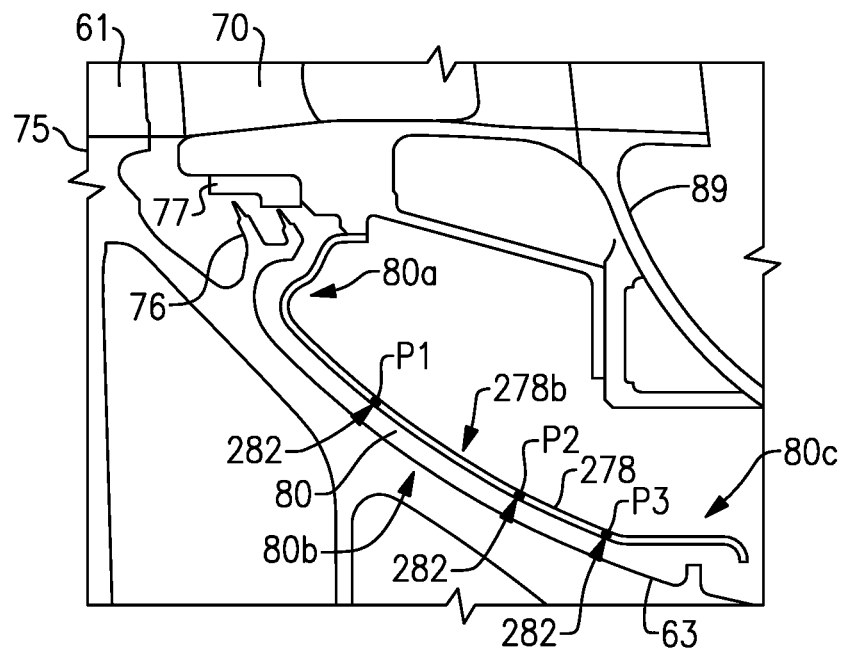
FIG. 6A schematically shows another example flow guide assembly.
Figure 6B:
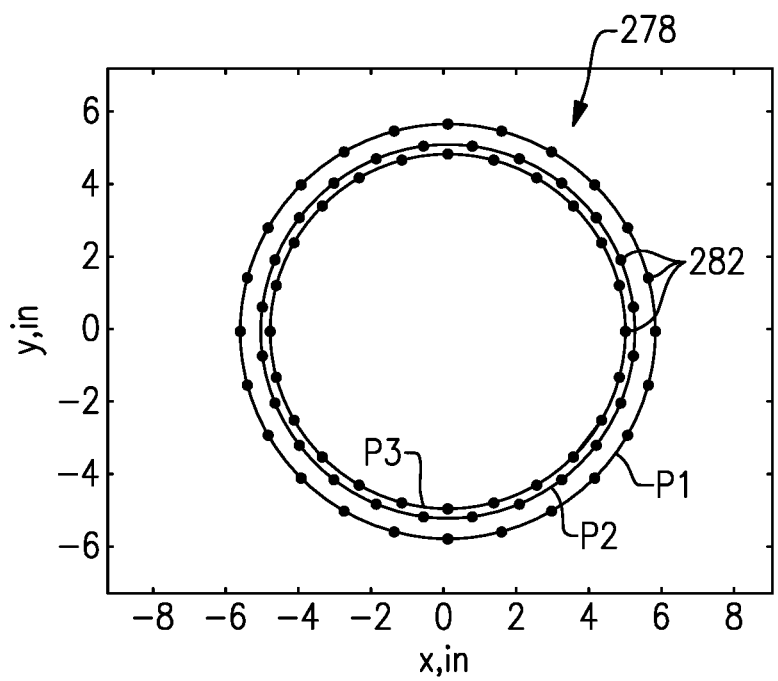
FIG. 6B schematically shows an arrangement of apertures in the example flow guide assembly of FIG. 6A.

Turning now to FIGS. 6A-B, another example flow guide assembly 278 is shown. In the example of FIGS. 6A-B, the flow guide assembly 278 includes a row of circumferentially spaced holes 282 at each of points P1, P2, and P3 along the flow guide assembly 278 (as discussed above, the flow guide assembly 278 is annular since it is arranged about the longitudinal axis A of the engine 20). FIG. 6B schematically shows a graph of the points P1, P2, and P3 and holes 282 where the point (0,0) represents the longitudinal axis A of the engine 20, the x-dimension represents a distance from the longitudinal axis A of the engine 20 in a first direction, e.g., a horizontal direction, and the y-dimension represents a distance from the longitudinal axis A of the engine 20 in one another direction orthogonal to the first direction, e.g., a vertical direction.

In this example, each of points P1, P2, and P3 are in an intermediate portion 278b of the flow guide assembly 278 which corresponds to intermediate portion 80b of the flow path 80. In a particular example, the point P1 is located at R=5.74 inches (145.8 millimeters), the point P2 is located at R=5.15 inches (130.8 millimeters), and the point P3 located at R=4.89 inches (124.2 millimeters) where R represents a radial distance from the longitudinal axis A of the engine 20. In other examples, the points P1, P2, and P3 can be in different portions of the flow guide 278.

In this example, each row of holes 282 includes 24 circular holes that are evenly circumferentially spaced around the flow guide assembly 278. The holes 282 in each row have a common diameter. The holes 282 have an increasing diameter moving from the inlet portion 80a of the flow path 80 to the outlet portion 80c of the flow path 80. That is, the holes 282 in the P1 row have the smallest diameter, the holes 282 in the P2 row have a diameter larger than the holes 282 in the P1 row, and the holes 282 in the P3 row have the largest diameter which is larger than the diameter of the holes 282 in the P1 and P2 rows. In a particular example, the holes 282 in the P1 row have a diameter of about 0.08 inches (about 2 millimeters), the holes 282 in the P2 row have a diameter of 0.1 inches (about 2.5 millimeters), and the holes 282 in the P3 row have a diameter of 0.125 inches (about 3.2 millimeters). However, it should be understood that the arrangement of holes 282 in each row (e.g., the spacing between holes 282), the number of holes 282 in each row and the size of the holes 282 can be different than in the aforementioned example. That is, the hole 282 size, geometry, arrangement, and/or orientation can be selected according to the options discussed above.

Figure 7A:
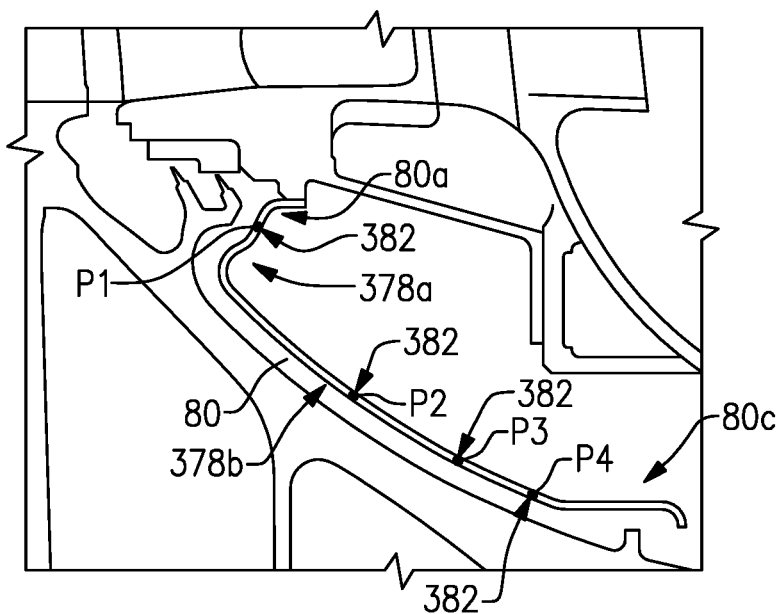
FIG. 7A schematically shows another example flow guide assembly.
Figure 7B:
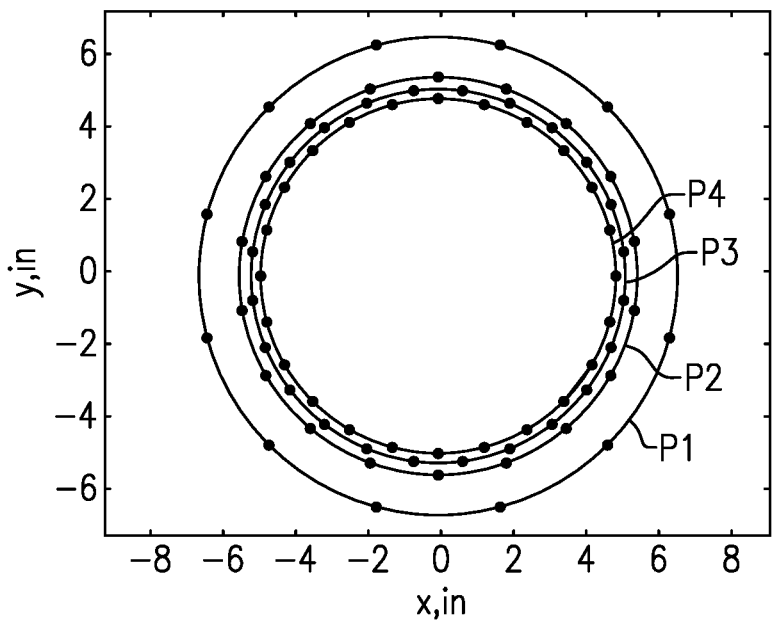
FIG. 7B schematically shows an arrangement of apertures in the example flow guide assembly of FIG. 7A.

Turning now to FIG. 7A-B, another example flow guide assembly 378 is shown. In the example of FIGS. 7A-B, the flow guide assembly 378 includes a row of circumferentially spaced holes 382 at each of points P1, P2, P3, and P4 along the flow guide assembly 378 (as discussed above, the flow guide assembly 378 is annular since it is arranged about the longitudinal axis A of the engine 20). FIG. 7B schematically shows a graph of the points P1, P2, P3, and P4 and holes 382 where the point (0,0) represents the longitudinal axis A of the engine 20, the x-dimension represents a distance from the longitudinal axis A of the engine 20 in a first direction, e.g., a horizontal direction, and the y-dimension represents a distance from the longitudinal axis A of the engine 20 in one another direction orthogonal to the first direction, e.g., a vertical direction.

In this example, point P1 is in an inlet portion 378a of the flow guide assembly 378 that corresponds to the inlet portion 80a of the flow path and each of points P2, P3, and P4 are in an intermediate portion 378b of the flow guide assembly 378 which corresponds to intermediate portion 80b of the flow path 80. In a particular example, the point P1 is located at R=6.65 inches (168.9 millimeters), the point P2 is located at R=5.50 inches (139.7 millimeters), the point P3 located at R=5.15 inches (130.8 millimeters), and the point P4 is located at R=4.94 inches (125.5 millimeters) where R represents a radial distance from the longitudinal axis A of the engine 20. In other examples, the points P1, P2, P3, and P4 can be in different portions of the flow guide 378.

In this example, each row of holes 382 includes circular holes that are evenly circumferentially spaced around the flow guide assembly 378. The holes 382 in each row have a common diameter. The holes 382 have an increasing diameter moving from the inlet portion 80a of the flow path 80 to the outlet portion 80c of the flow path 80. That is, the holes 382 in the P1 row have the smallest diameter, the holes 382 in the P2 row have a larger diameter than the holes 382 in the P1 row, and so forth.

In a particular example, there are 12 evenly circumferentially spaced holes 382 in the P1 row, 18 evenly circumferentially spaced holes 382 in the P2 row, 24 evenly circumferentially spaced holes 382 in the P3, and 24 evenly circumferentially spaced holes 382 in the P4 row. In this example, holes 382 in the P1 row have a diameter of about 0.095 inches (about 2.4 millimeters), the holes 382 in the P2 row have a diameter of 0.0917 inches (about 2.3 millimeters), the holes 382 in the P3 row have a diameter of 0.1014 inches (about 2.6 millimeters), and the holes 382 in the P4 row have a diameter of 0.1278 inches (about 3.3 millimeters). However, it should be understood that the arrangement of holes 282 in each row (e.g., the spacing between holes 282), the number of holes 282 in each row and the size of the holes 282 can be different than in the aforementioned example. That is, the hole 282 size, geometry, arrangement, and/or orientation can be selected according to the options discussed above.

In another particular example, there are 24 evenly circumferentially spaced holes 382 in each of the rows at P1, P2, P3, and P4. In this example, holes 382 in the P1 row have a diameter of about 0.0582 inches (about 1.5 millimeters), the holes 382 in the P2 row have a diameter of 0.0688 inches (about 1.7 millimeters), the holes 382 in the P3 row have a diameter of 0.0879 inches (about 2.2 millimeters), and the holes 382 in the P4 row have a diameter of 0.1107 inches (about 2.8 millimeters). However, it should be understood that the arrangement of holes 382 in each row (e.g., the spacing between holes 382), the number of holes 382 in each row and the size of the holes 382 can be different than in the aforementioned example. That is, the hole 382 size, geometry, arrangement, and/or orientation can be selected according to the options discussed above.

The foregoing description shall be interpreted as illustrative and not in any limiting sense. A worker of ordinary skill in the art would understand that certain modifications could come within the scope of this disclosure. Moreover, it should be understood the foregoing description is applicable to any gas turbine engine architecture, and the engine 20 discussed above is only exemplary. For these reasons, the following claims should be studied to determine the true scope and content of this disclosure.

What is claimed is:

1. A section for a gas turbine engine comprising:
    a rotating structure;
    a stationary structure;
    a flow guide assembly arranged generally between the rotating structure and the stationary structure such that a flow path is defined between the flow guide assembly and one of the rotating structure and the stationary structure, the flow guide assembly including a plurality of apertures configured to disrupt acoustic waves of air in the flow path; and
    a seal configured to establish a sealing relationship between the rotating structure and the stationary structure, and wherein an inlet to the flow path is adjacent the seal.

2. The section of claim 1, wherein the rotating structure includes a hub carrying a plurality of blades, and the flow path is defined between the hub and the flow guide assembly.

3. The section of claim 2, wherein the hub is a hub of a high pressure compressor in the gas turbine engine.

4. The section of claim 1, wherein at least one of the plurality of apertures is defined by an offset of the flow guide assembly from a baseline geometry of the flow guide assembly.

5. The section of claim 1, wherein a point P is defined along a length of the flow guide assembly, and wherein the plurality of apertures are arranged between the point P and an outlet portion of the flow guide assembly.

6. The section of claim 5, wherein the plurality of apertures are arranged in a spiral pattern.

7. The section of claim 5, wherein the point P is a distance from an outlet portion of the flow guide assembly that is approximately equal to an acoustic wavelength associated with an acoustic-structural coincidence frequency in the flow path.

8. The section of claim 5, wherein a percent open area (POA) of the plurality of apertures increases from the point P to the outlet portion of the flow guide assembly.

9. The section of claim 8, wherein the POA of the plurality of apertures increases from about 1% at point P to less than about 10% near the outlet portion of the flow guide assembly.

10. The section of claim 9, wherein the POA of the plurality of apertures increases from about 1% at point P to about 3% near the outlet portion of the flow guide assembly.

11. The section of claim 1, wherein the flow guide assembly includes an inlet portion adjacent an inlet to the flow path, an outlet portion adjacent an outlet to the flow path, and an intermediate portion between the inlet portion and the outlet portion, and wherein the plurality of apertures are arranged in one or more circumferential rows in the intermediate portion.

12. The section of claim 11, wherein the one or more circumferential rows includes three rows.

13. The section of claim 11, further comprising a circumferential row of apertures adjacent the inlet portion.

14. The section of claim 13, wherein the diameter of the plurality of apertures in the one or more circumferential rows increases from the inlet portion to the outlet portion.

15. A gas turbine engine comprising:
    a compressor section that defines a core flow path, the compressor section including a first compressor and a second compressor downstream of the first compressor;
    a combustor section in fluid communication with the compressor section;
    a turbine section that drives the compressor section; and
    wherein at least one of the compressor section and the turbine section includes a rotor assembly, the rotor assembly comprising:
        a rotor including a hub carrying a plurality of blades, the hub rotatable about a longitudinal axis;
        a flow guide assembly arranged adjacent the hub such that a flow path is defined between the hub and the flow guide assembly, the flow guide assembly including a plurality of apertures configured to disrupt acoustic waves in the flow path; and
        a seal that extends outwardly from the hub to establish a sealing relationship with a plurality of vanes distributed about the longitudinal axis, and wherein an inlet to the flow path is adjacent the seal.

16. The gas turbine engine of claim 15, wherein at least some of the acoustic waves are generated by vibration of the seal.

17. The gas turbine engine of claim 15, wherein a point P is defined along a length of the flow guide assembly, and wherein the plurality of apertures are arranged between the point P and an outlet portion of the flow guide assembly.

18. The gas turbine engine of claim 15, wherein the flow guide assembly includes an inlet portion adjacent the inlet to the flow path, an outlet portion adjacent an outlet to the flow path, and an intermediate portion between the inlet portion and the outlet portion, and wherein the plurality of apertures are arranged in one or more circumferential rows in the intermediate portion.

19. The gas turbine engine of claim 15, wherein the flow guide assembly is a structure that comprises a single-layered wall.

20. A method of disrupting acoustic waves in a flow path of a gas turbine engine, comprising:
    communicating flow between a core flow path of the gas turbine engine and an annular flow path, the annular flow path defined between a rotating structure and a flow guide assembly, wherein the flow guide assembly includes a plurality of apertures configured to disrupt acoustic waves of air in the flow path.

* * * * *